United States Patent
Ohmori et al.

(10) Patent No.: US 6,337,301 B1
(45) Date of Patent: Jan. 8, 2002

(54) PHOTOCATALYTIC METAL OXIDE COMPOSITION, THIN FILM, AND COMPOSITE

(75) Inventors: Masahiro Ohmori, Ichihara; Hidenori Nakamura, Kawasaki; Noriko Murase, Chiba; Nobuo Uotani; Takashi Ohkubo, both of Ichihara, all of (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/585,621

(22) Filed: Jun. 2, 2000

Related U.S. Application Data

(63) Continuation-in-part of application No. PCT/JP98/05374, filed on Nov. 30, 1998.
(60) Provisional application No. 60/094,492, filed on Jul. 29, 1998.

(30) Foreign Application Priority Data

Dec. 2, 1997 (JP) .............................................. 9-331614
May 18, 1998 (JP) ............................................ 10-135550

(51) Int. Cl.[7] .............................. B01J 21/00; B01J 21/06
(52) U.S. Cl. .................... 502/350; 502/349; 106/286.4; 106/287.19
(58) Field of Search .................................. 428/688, 689, 428/696, 697, 702; 502/349, 350; 106/286.11, 287.19

(56) References Cited

U.S. PATENT DOCUMENTS 5,690,922 A * 11/1997 Mouri et al. ................ 424/76.1
5,897,958 A * 4/1999 Yamada et al. ............. 446/474

OTHER PUBLICATIONS

Fu et al. Enhanced Photocatalytic Performance of Titania–Based Binary Metal Oxides: TiO2/SiO2 and TiO2/ZrO2. Environ. Sci. Technol. 1996, 30, 947–953.*

* cited by examiner

Primary Examiner—Deborah Jones
Assistant Examiner—James de la Peña
(74) Attorney, Agent, or Firm—Sughrue, Mion, Zinn, Macpeak & Seas, PLLC

(57) ABSTRACT

A composition comprising metal oxide particles having photo-catalytic activity, a solvent-soluble zirconium compound and a solvent. Preferably, the metal oxide particles having photocatalytic activity are titanium oxide particles; the metal oxide particles have an average particle diameter of about 0.005 to 0.3 $\mu$m; and the amount of the zirconium compound is in the range of about 3–200 parts by weight, as $ZrO_2$, per 100 parts by weight of the metal oxide articles. A composite of a film having a photo-catalytic activity with a base material is made by coating the base material with the above composition to form a film, and curing the film on the base material.

15 Claims, No Drawings

PHOTOCATALYTIC METAL OXIDE COMPOSITION, THIN FILM, AND COMPOSITE

CROSS REFERENCE TO RELATED APPLICATIONS

This application is a continuation-in-part application of international application PCT/JP98/05374 filed Nov. 30, 1998. This application is an application filed under 35 U.S.C. §111(a) claiming benefit pursuant to 35 U.S.C. §119(e)(1) of the filing date of Provisional Application 60/094,492 filed Jul. 29, 1998 pursuant to 35 U.S.C. §111 (b).

TECHNICAL FIELD

This invention relates to a composition comprising a photo-catalytic metal oxide.

The photo-catalytic metal oxide-containing composition of the invention is characterized in that the photo-catalytic activity is maintained at a sufficiently high level, the viscosity increase with time is extremely reduced and the workability is excellent, and thus, the photo-catalytic composition is suitably coated as a film-forming material on a base material.

BACKGROUND ART

In recent years, extensive researches have been made for utilizing the photo-catalytic action of metal oxides such as titanium oxide. The photo-catalytic metal oxide has excellent functions, for example, of preventing pollution by removing harmful substances, of decomposing ammonia and sulfur compounds in air for purification, and of sterilization. Thus, the use of photo-catalytic metal oxides is being expected in various fields. Particles of the photo-catalytic metal oxide are utilized in various forms depending upon the particular intended use thereof, such as bulk particles, a sol and a film. In view of the practical use, the photo-catalytic metal oxide particles are made into a film in many cases because of ease in handling.

As the method of forming photo-catalytic metal oxide particles into a film, a sol-gel method is known wherein a photo-catalytic metal oxide film is formed on a surface of glass sheet as a base material, from a metal alkoxide raw material. The sol-gel method is, however, disadvantageous in that the starting material is expensive and the working environment is polluted and a problem arises in safety because a large quantity of an organic solvent is used. Further, the process of firmly bonding a film of the photo-catalytic metal oxide to the base material must be performed at a high temperature. Thus, a base material used for a sol-gel method must be heat-resistant and this is an obstacle to enlargement of the use.

Attempts have been proposed for bonding photo-catalytic metal oxide particles onto a base material through a binder such as a film-forming composition comprising a hydrolysate of a hydrolyzable silicon compound as a binder in Japanese Unexamined Patent Publication No. H8-164334 (Japanese unexamined patent publication is hereinafter abbreviated to "JP-A"), and a coating composition comprising a film-forming material comprising a siloxane polymer or silicate, and a hydrolyzable silane derivative monomer as a binder in JP-A H9-188850. These proposed compositions contain a hydrolyzable silicon compound, which is gradually hydrolyzed to allow a polycondensation reaction to proceed. As a result, the composition undergo decrease in adhesion strength or increase of viscosity during storage, and thus, the pot life is undesirably shortened.

A coating composition comprising titanium oxide having photo-catalytic activity, a hydrolyzable organic metal compound, and an aqueous solvent has been proposed in JP-A H9-40872. The organic metal compound is subject to hydrolysis, and thus, the increase in viscosity of the composition and the reduction of adhesion strength thereof occur during storage of the composition. Therefore, the proposed composition must be used as a two-pack type composition, and the addition of water and a catalyst must be carried out immediately before the coating, and thus, the handling property is poor.

Various attempts have heretofore been made to use a film of a photo-catalytic metal oxide by fixing the film to be supported on a base material such as glass or plastic material. However, the level of properties required for the fixed photo-catalytic metal oxide film is high, and photo-catalytic metal oxide films capable of satisfying the requirements have not yet been found.

DISCLOSURE OF THE INVENTION

An object of the present invention is to provide a composition comprising a photo-catalytic metal oxide capable of maintaining the photo-catalytic activity at a sufficiently high level, exhibiting an increase of viscosity with time only to a negligible extent, having good workability, and exhibiting good adhesion when the composition is coated as a film-forming material on a base material.

Another object of the invention is to provide a film made from the above-mentioned photo-catalytic metal oxide-containing composition.

Still another object of the invention is to provide a composite of a photo-catalytic metal oxide film with a base material, which is formed by coating a surface of the base material with the photo-catalytic metal oxide-containing composition, and is characterized as being transparent and possessing high adhesion between the film and the base material whereby the film is not easily separated from the base material.

As a result of extensive investigations for photo-catalytic metal oxide-containing compositions using various film-forming materials, the present inventors have found that a photocatalytic metal oxide-containing composition having incorporated therein a specific zirconium compound is suitable as a film-forming material capable of maintaining the photocatalytic activity at a sufficiently high level, exhibiting an increase of viscosity with time only to a negligible extent, having good workability, and exhibiting good adhesion when the composition is coated as a film-forming material on a base material.

Thus, in one aspect of the present invention, there is provided a composition comprising metal oxide particles having photo-catalytic activity, a solvent-soluble and non-hydrolyxable zirconium compound, and a solvent.

In another aspect of the present invention, there is provided a film made from the above-mentioned composition comprising the photo-catalytic metal oxide particles.

In a further aspect of the present invention, there is provided a composite of a film with a base material, said film being formed from the above-mentioned composition comprising the photo-catalytic metal oxide particles.

BEST MODE FOR CARRYING OUT THE INVENTION

The photo-catalytic metal oxide particles for use in the present invention comprise particles of a metal oxide exhibiting a catalytic activity for oxidation-reduction reaction of an organic compound when the metal oxide particles are irradiated with light having an energy larger than the band gap between the conduction band and the valence band of the crystal.

As specific examples of the photo-catalytic metal oxide particles, there can be mentioned particles of rutile titanium oxide, anatase titanium oxide, brookite titanium oxide, strontium titanate, tin oxide, zinc oxide and iron oxide.

The photo-catalytic reaction occurs in the vicinity of the surface of the metal oxide particle, and accordingly, the metal oxide particle preferably has a small particle size. However, those having an average particle diameter of smaller than about 0.005 $\mu$m are difficult to produce, therefore, the average particle diameter is usually in the range of about 0.005 to about 0.3 $\mu$m, preferably from about 0.01 to about 0.1 $\mu$m. The specific surface area is preferably in the range of about 50 to about 300 $m^2/g$.

Of the photo-catalytic metal oxides, titanium oxide is most preferably because it is commercially available as finely divided particles, and harmless and chemically stable. Any conventional titanium oxide prepared by known methods can be used in the invention. In the case where titanium oxide is prepared by hydrolysis, the titanium oxide-containing sol prepared by hydrolysis can be used. Alternatively, the titanium oxide-containing sol is formed into a finely divided titanium oxide powder, which is then dispersed in a liquid medium to prepare a photo-catalytic oxide composition. Finely divided titanium oxide particles may also be prepared by a vapor phase method. Especially preferably finely divided titanium oxide particles are prepared by a method of hydrolyzing titanium chloride or titanium sulfate because the operation is easy and the cost is low.

The hydrolysis method is not particularly limited, but it is preferable that hydrolysis is performed in a hydrolysis vessel equipped with a reflux condenser while the gas evaporated is condensed to flow back into the vessel. The finely divided titanium oxide particles have good dispersibility and a film made therefrom exhibits good transparency.

The amount of the photo-catalytic metal oxide in the composition is preferably in the range of about 1 to about 25% by weight based on the total weight of the composition. If the amount is smaller than about 1% by weight, the photo-catalytic activity is poor. In contrast, if it exceeds about 25% by weight, the dispersibility of metal oxide particles is reduced to cause undesirable increase in viscosity of a coating solution, and the composition becomes unstable.

The zirconium compound for use in the present invention exhibits a function of binder when the photo-catalytic metal oxide-containing composition is coated on a base material. The zirconium compound is not particularly limited provided that it is soluble in water or an organic solvent, and non-hydrolyzable. By the term "non-hydrolyzable" used herein, we mean that the zirconium compound is not hydrolyzed during the preparation and storage of the composition of the present invention.

As specific examples of the zirconium compound, there can be mentioned acidic aqueous solution-forming zirconium compounds such as zirconium oxychloride, zirconium hydroxychloride, zirconium nitrate, zirconium sulfate and zirconium acetate; alkaline aqueous solution-forming zirconium compounds such as ammonium zirconium carbonate, potassium zirconium carbonate and sodium zirconium phosphate; and organic solvent-soluble zirconium compounds such as zirconium propionate. Especially water-soluble zirconium compounds such as zirconium oxychloride, zirconium hydroxychloride, zirconium nitrate and ammonium zirconium carbonate are preferable because an organic solvent is not used for the preparation of a solution, and the working environment is not contaminated. A complex or complex salt of a zirconium compound having at least one group selected from hydroxyl group and carbonate group, and a high-molecular-weight zirconium compound thereof may also be used. The high-molecular-weight zirconium compound is commercially available. For example, it is supplied by Magnesium Elektron Ltd. (see "Data Sheet 150", published Sept. 1985 by the same company).

The solvent-soluble and non-hydrolyzable zirconium compounds may be used either alone or as combination of at least two thereof.

When an aqueous dispersion of the photo-catalytic metal oxide composition in the form of a sol if used, if the sol of composition is acidic, it is preferable to use a zirconium compound having acidity, or if the sol of composition is alkaline, a zirconium compound having alkalinity is preferably used, so that pH shock can be avoided.

The amount of the zirconium compound to be incorporated in the composition is preferably in the range of about 3 to about 200 parts by weight, calculated as the weight of $ZrO_2$, per 100 parts by weight of the photo-catalytic metal oxide particles. If the amount of the zirconium compound as $ZrO_2$ is smaller than about 3 parts by weight, the film formed on a base material is fixed to the base material with a weak bond a strength. In contrast, if the amount of the zirconium compound as $ZrO_2$ is larger than about 200 parts by weight, the photo-catalytic activity is reduced to a great extent. When titanium oxide particles are used as the photo-catalytic metal oxide particles, the degree of variation of the contact angle of the film occurring upon irradiation of light can be controlled by appropriately choosing the proportion of the zirconium compound to the titanium oxide particles. The amount of the zirconium compound as $ZrO_2$ is more preferably in the range of about 5 to about 60 parts by weight.

The solvent for use in the present invention is at least one selected from water and organic solvents. Among organic solvents, those which are hydrophilic are preferable. As specific examples of the hydrophilic organic solvents, there can be mentioned monohydric alcohols such as methanol, ethanol, propanol and butanol, polyhydric alcohols such as ethylene glycol, diethylene glycol and glycerin, ketones such as acetone and methyl ethyl ketone; esters such as ethyl acetate and butyl acetate; and cellosolves such as ethyl cellosolve. These solvents may be used either alone or as a combination of two or more thereof. A suitable solvent is determined preferably by taking account of the stability of the composition, the kind of a base material, the drying conditions employed at the formation of a film, and the production cost.

The composition of the present invention comprises metal oxide particles having photo-catalytic activity, a solvent-soluble zirconium compound and a solvent. Various additives may be incorporated in the composition. For example, to enhance the film-forming property of the composition, a thickening agent such as glyoerin, polyvinyl alcohol, methyl cellulose and polyethylene glycol, and a dispersant such as polyacrylic acid and polymethacrylic acid may be incorporated. Metal particles such as silver or copper may be added to impart to the composition a sterilizing activity exhibited even in a dark place. A platinum group metal such as palladium or platinum may be added to enhance the photo-catalytic activity. These additives are incorporated each in an amount of approximately in the range of 10 to 10,000 ppm.

The composition of the present invention can be prepared by mixing together the photo-catalytic metal oxide particles, the solvent-soluble zirconium compound, the solvent, and optional additives described above, with stirring. The as-prepared composition can be stored as it is.

The composition of the present invention is coated on a base material made of various materials or molded articles to form a photo-catalytic metal oxide film on the surface of the base material. As specific examples of the base material, there can be mentioned glass, plastics, ceramics, metals, wood, paper and concrete. Especially glass is preferable. An electric lamp and lighting fixtures can also be a base material for coating. In the case where these molded articles are used, the solvent contained in the composition is preferably a mixed solvent composed of water and an organic solvent.

The thickness of the film formed on the base material is preferably in the range of about 0.05 to about 2 $\mu$m. If the film thickness is smaller than about 0.05 $\mu$m, the photo-catalytic activity is poor. In contrast, if the film thickness exceeds about 2 $\mu$m, the film is readily separated from the base material, and such a large thickness is not preferred from a cost consideration.

The composition of the present invention can be coated on a base material by any known methods. For example, spin coating, flow coating, dip coating, spray coating, bar coating and brush coating can be employed. To prevent deterioration of the base material by the photo-catalytic metal oxide particles, an undercoat composed of silica or a fluororesin can be formed as an intermediate layer between the film and the base material, prior to the coating of the film.

After coating, the film is cured, for example, by allowing the film to stand at room temperature or subjecting it to heat treatment. The curing temperature is in the range of about 20 to about 200° C., preferably about 20 to about 150° C. The curing time varied depending upon the particular solvent used, but is usually about 10 minutes when the film is cured, for example, at about 100° C. When a heat-resistant base material is used, the curing can be performed at a high temperature of about 200 to about 400° C. to sinter the photo-catalytic metal oxide particles.

The invention will now be specifically described by the following examples that by no means limit the scope of the invention.

Preparation of Aqueous Dispersion of Titanium Oxide Sol

Water was added to titanium tetrachloride (purity: 99.9%) to prepare an aqueous titanium tetrachloride solution having a concentration of 0.25 mol/l (2% by weight as expressed in terms of titanium dioxide). During the preparation of the solution, the aqueous solution was ice-cooled by a cooling device so that the temperature of the aqueous solution did not exceed 50° C. Then 1 liter of the aqueous solution was charged in a reaction vessel with a reflux condenser, heated to a temperature (104° C.) in the vicinity of the boiling point, and maintained at this temperature for 60 minutes to allow the hydrolysis to proceed, thereby preparing an aqueous dispersion of titanium oxide sol. The sol was concentrated by decantation and then an aqueous dispersion of titanium oxide sol having a titanium oxide concentration of 25% by weight and a pH value of 5.5 was obtained by using an electrodialyser G3 may by Asahi Chemical Industry Co., Ltd. A part of the acidic titanium oxide sol was sampled and its particle diameter was measured by an electrophoretic light scattering photometer. The acidic titanium oxide sol was proved to have an average particle diameter of 0.05 $\mu$m and a specific surface area of 122 m$^2$/g.

Using this acidic titanium oxide sol, coating solutions (coating composition) were prepared as follows.

EXAMPLE 1

Hydrochloric acid was added to the acidic titanium oxide sol to adjust the concentration of titanium oxide to 20% by weight and the pH value to 4. To 20 g of the thus-prepared acidic titanium oxide sol, 6 g of an aqueous zirconium acetate solution having a concentration of 2% by weight as ZrO$_2$ and 28 g of pure water were added to prepare a coating solution having a ZrO$_2$/TiO$_2$ ratio of 33% by weight.

EXAMPLE 2

Water was added to the acidic titanium oxide sol to adjust the concentration of titanium oxide to 20% by weight and the pH value to 5.5. To 20 g of the thus-prepared acidic titanium oxide sol, 10 g of an aqueous zirconium acetate solution having a concentration of 22% by weight as ZrO$_2$ and 24 g of pure water were added to prepare a coating solution having a ZrO$_2$/TiO$_2$ ratio of 55% by weight.

EXAMPLE 3

Nitric acid was added to the acidic titanium oxide sol to adjust the concentration of titanium oxide to 20% by weight and the pH value to 3.5. To 20 g of the thus-prepared acidic titanium oxide sol, 8 g of an aqueous zirconium acetate solution having a concentration of 20% by weight as ZrO$_2$ and 27 g of pure water were added to prepare a coating solution having a ZrO$_2$/TiO$_2$ ratio of 40% by weight.

EXAMPLE 4

Water and ethanol were added to the acidic titanium oxide sol to adjust the concentration of titanium oxide to 10% by weight and the pH value to 5.5. to 40 g of the thus-prepared acidic titanium oxide sol, 10 g of an aqueous zirconium hydroxychloride solution having a concentration of 20% by weight as ZrO$_2$ and 10 g of pure water were added to prepare a coating solution having a ZrO$_2$/TiO$_2$ ratio or 50% by weight and a water/ethanol ratio of 25/75 by weight.

EXAMPLE 5

An acidic aqueous dispersion of a titanium oxide sol having a concentration of 30% by weight and a pH value of 1.4 was prepared from a commercially available anatase titanium oxide particle having a specific surface area of 270 m$^2$/g. To 13.3 g of the acidic titanium oxide sol. 9 g of an aqueous zirconium hydroxychloride solution having a concentration of 20% by weight as ZrO$_2$ and 20 g of ethanol were added to prepare a coating solution having a ZrO$_2$/TiO$_2$ ratio of 45% by weight and a water/ethanol ratio of 10/90 by weight.

EXAMPLE 6

Aqueous ammonia and methanol were added to the acidic titanium oxide sol to adjust the concentration of titanium oxide to 20% by weight and the pH value to 9. to 20 g of the thus-prepared alkaline titanium oxide sol, 8.5 g of an aqueous ammonium zirconium acetate solution having a concentration of 20% by weight as ZrO$_2$ and 10 g of methyl alcohol were added to prepare a coating solution having a ZrO$_2$/TiO$_2$ ratio of 42.5% by weight and water/methanol ratio of 15/85 by weight.

EXAMPLE 7

Hydrochloric acid and ethanol were added to the acidic titanium oxide sol to adjust the concentration of titanium oxide to 20% by weight and the pH value to 4. To 20 g of the thus-prepared acidic titanium oxide sol, 4 g of an aqueous zirconium hydroxychoride solution having a concentration of 20% by weight as $ZrO_2$ and 10 g of ethanol were added to prepare a coating solution having a $ZrO_2/TiO_2$ ratio of 20% by weight and a water/methanol ratio of 25/75 by weight.

COMPARATIVE EXAMPLE 1

To 20 g of an aqueous dispersion of a titanium oxide sol having a concentration of 20% by weight and a pH value of 2, 5 g of tetraethoxysilane, 10 g of ethanol and 20 g of isopropanol were added to prepare a coating solution having an $SiO_2/TiO_2$ ratio of 35% by weight.

COMPARATIVE EXAMPLE 2

To 20 g of an aqueous dispersion of a titanium oxide sol having a concentration of 20% by weight and a pH value of 4, 5.2 g of tetraethoxysilane, 10 g of methanol and 20 g of pure water were added to prepare a coating solution having an $SiO_2/TiO_2$ ratio of 50% by weight.

COMPARATIVE EXAMPLE 3

To 20 g of an aqueous dispersion of a titanium oxide sol having a concentration of 20% by weight and a pH value of 2, 30 g of pure water were added to prepare a coating solution.

Film Formation

A soda lime glass sheet having a size of 76 mm×26 mm as a base material was coated with 2 ml of the coating solution prepared in each of the examples and comparative examples. The glass sheet was kept perpendicularly for 10 minutes to allow the excessive coating solution to flow down. The coated glass sheet was maintained at 150° C. in a dryer for 10 minutes to cure the coating on the glass sheet. Properties of the thus-formed film, namely, transparency, photo-catalytic activity, bonding strength, adhesion strength, pencil hardness, viscosity increase with time, and change of contact angle of water after irradiation were evaluated by the following methods. The evaluation results are shown in Table 1.

For comparison, each coating solution was allowed to stand at room temperature for 30 days. Then, the coating solution was formed into a film in the same manner as mentioned above, and the above-mentioned properties of the film were evaluated by the following methods. The evaluation results are shown in Table 2.

(1) Transparency

Transparency was determined according to JIS K6718 using a haze meter made by Tokyo Denshoku Gijutsu Center L.C. the following three ratings were assigned to the evaluation results.

A: Haze ratio is smaller than 2%

B: Haze ratio is at least 2.5% but smaller than 5.0%

C; Haze ratio is at least 5%

(2) Photocatalytic activity

Photo-catalytic activity of the film was evaluated by the color change of red ink. The film-coated base material was coated with a few drops of red ink, and then, irradiated with ultraviolet light with wavelength of 365 nm by a black light at an ultraviolet intensity of 2.1 $mW/cm^2$ for 30 minutes. The discoloration of red ink was visually observed and the following three ratings were assigned.

A: Well discolored

B: Partially not discolored

C: Not discolored (3) Bonding strength

Bonding strength was evaluated by a water wiping test and an alcohol wiping test. The film coated soda lime glass sheet was rubbed with in ten reciprocation motions with KIMWIPE (made by Krecia) wetted with water or an alcohol, and then, wiped off with dry KIMWIPE in ten reciprocation motions. Thereafter the surface state of film was visually observed according to the following three ratings.

A: Film was not marred

B: Film was not rubbed off, but partly marred

C: Film was partly rubbed off (4) Adhesion strength

Adhesion strength was determined by a cross-cut tape adhesion test according to JIS K5400, where the scratch interval was 1 mm and the number of squares was 100. The evaluation results were expressed by the following three ratings.

A: corresponding to rankings 10 to 8 stipulated in JIS K5400

B: corresponding to rankings 7 to 5 stipulated in JIS K5400

C: corresponding to rankings 4 to 1 stipulated in JIS K5400

(5) Viscosity stability

Viscosity stability was evaluated by the increment of viscosity of the coating solution after standing for 30 days. The kinetic viscosity of the coating solution was measured on the day of preparation of the coating solution and after standing of the coating solution at room temperature for 30 days using Canon Fenske Viscometer according to JIS K2283. The following three ratings were assigned to the increment in percentage of viscosity.

A: Viscosity increment is smaller than 5%

B: Viscosity increment is at least 5% but smaller than 50%

C: Immeasurable due to gelation or phase separation (6) Contact angle

Contact angle of water on the film was measured before and after irradiation of the film with ultraviolet light by a black light (20W, made by Toshiba Corp.) at an ultraviolet intensity of 2.0 $mW/cm^2$ for 1 hour. The measurement of contact angle was conducted at 25° C. and 70 RH% by a contact angle meter CA-D made by Kyowa Interface Science K.K.

(7) Pencil hardness

Pencil hardness was measured according to JIS K5400 (Testing Method for Pencil Hardness).

TABLE 1

Evaluation on the Day of Preparation

|  | Example | | | | | | | Comparative Example | | |
| --- | --- | --- | --- | --- | --- | --- | --- | --- | --- | --- |
|  | 1 | 2 | 3 | 4 | 5 | 6 | 7 | 1 | 2 | 3 |
| Binder | $ZrO_2$ | $ZrO_2$ | $ZrO_2$ | $ZrO_2$ | $ZrO_2$ | $ZrO_2$ | $ZrO_2$ | $SiO_2$ | $SiO_2$ | — |
| Binder/$TiO_2$ ratio (wt %) | 33 | 55 | 40 | 50 | 45 | 43 | 20 | 35 | 50 | 0 |
| Properties |  |  |  |  |  |  |  |  |  |  |
| Transparency | A | A | A | A | B | B | A | A | A | A |
| Photo-catalytic activity | A | A | A | A | A | A | A | B | C | A |
| Bonding strength | A | A | A | A | A | A | A | B | A | C |
| Adhesion strength | A | A | A | A | A | B | A | C | A | C |
| Pencil hardness | 4H | 5H | 4H | 5H | 3H | 3H | 3H | 2H | 3H | B |
| Viscosity increase | A | A | A | A | A | B | A | C | C | A |
| Contact angle (°) |  |  |  |  |  |  |  |  |  |  |
| Before irradiation | 50 | 55 | 45 | 51 | 43 | 40 | 42 | 68 | 75 | 40 |
| After irradiation | 10 | 24 | 16 | 20 | 18 | 15 | 4 | 6 | 8 | 7 |

TABLE 2

Evaluation after Storage at Room Temperature for 30 Days

|  | Example | | | | | | | Comparative Example | | |
| --- | --- | --- | --- | --- | --- | --- | --- | --- | --- | --- |
|  | 1 | 2 | 3 | 4 | 5 | 6 | 7 | 1 | 2 | 3 |
| Binder | $ZrO_2$ | $ZrO_2$ | $ZrO_2$ | $ZrO_2$ | $ZrO_2$ | $ZrO_2$ | $ZrO_2$ | $SiO_2$ | $SiO_2$ | — |
| Binder/$TiO_2$ ratio (wt %) | 33 | 55 | 40 | 50 | 45 | 43 | 20 | 35 | 50 | 0 |
| Properties |  |  |  |  |  |  |  |  |  |  |
| Transparency | A | A | A | A | B | B | A | C | C | A |
| Photo-catalytic activity | A | A | A | A | A | A | A | C | C | A |
| Bonding strength | A | A | A | A | A | A | A | C | C | C |
| Adhesion strength | A | A | A | A | A | B | A | C | C | C |
| Pencil hardness | 4H | 5H | 4H | 5H | 3H | 3H | 3H | 7B | 7B | B |
| Viscosity increase | A | A | A | A | A | B | A | C | C | A |
| Contact angle (°) |  |  |  |  |  |  |  |  |  |  |
| Before irradiation | 52 | 53 | 48 | 53 | 40 | 41 | 38 | 66 | 69 | 38 |
| After irradiation | 11 | 20 | 14 | 18 | 16 | 12 | 5 | 5 | 6 | 6 |

INDUSTRIAL APPLICABILITY

According to the present invention, a composition comprising photo-catalytic metal oxide particles is provided, which is characterized by maintaining a photo-catalytic activity at a high level, exhibiting a very small change of viscosity with time, and having good working property. A film made by coating a base material with this composition and then curing the thus-formed film, is transparent, and has high and durable bonding strength to the base material.

A film made from the composition of the present invention is activated upon irradiation with ultraviolet light and exhibits high and durable photo-catalytic activity. Thus, the film exhibits good stain resistance due to removal of harmful substances, enhanced activity of decomposing ammonia and sulfur-containing compounds in the air, and good sterilizing activity.

A composite of the film formed on a base material such as ceramics, metals, glass, plastics, paper, wood, fiber and concrete, is expected to be used in many fields. As specific examples of the film/base material composite, there can be mentioned stain-resistant lighting equipment for expressway, a stain-resistant transparent sound-insulating wall for expressway, a NOX-removing sound-insulating wall exhibiting a NOX-removing activity, a fluorescent lamp for deodorizing a room and keeping good illuminance for a long period, stain-resistant fluorescent lamp fixtures, mirrors, goggles, lenses, hydrophilic and non-fogging window panes, advertisement boards for road, signboards, guard rails, stain-resistant supports, stain-resistant and antimicrobial tiles, stain-resistant building materials, stain-resistant exterior materials, stain-resistant buildings and structures, wall paper, stain-resistant window frames, CRT, stain-resistant and non-fogging plasma display boards, stain-resistant liquid crystal display boards, automobile bodies, stain-resistant metal parts and exteriors for electric cars, air planes and ships, and stain-resistant fibrous articles.

What is claimed is:

1. A coating composition comprising titanium oxide particles having photo-catalytic activity, a solvent-soluble and non-hydrolyzable zirconium compound, and a solvent.

2. The composition according to claim 1, wherein the metal oxide particles having photo-catalytic activity have an average particle diameter in the range of about 0.005 to 0.3 μm.

3. The composition according to claim 1, wherein the solvent is at least one solvent selected from the group consisting of water and hydrophilic organic solvents.

4. The composition according to claim 1, wherein the solvent-soluble and non-hydrolyzable zirconium compound is at least one compound selected from the group consisting of zirconium oxychloride, zirconium hydroxychloride, zirconium nitrate and ammonium zirconium carbonate.

5. The composition according to claim 1, wherein the amount of the zirconium compound is in the range of about 3 to about 200 parts by weight, as $ZrO_2$, per 100 parts by weight of the metal oxide particles having photo-catalytic activity.

6. A film made from a coating composition comprising titanium oxide particles having photo-catalytic activity, a solvent-soluble and non-hydrolyzable zirconium compound, and a solvent; said film having a thickness in the range of about 0.05 $\mu$m to about 2 $\mu$m.

7. The film according to claim 6, wherein the metal oxide particles having photo-catalytic activity have an average particle diameter in the range of about 0.005 to 0.3 $\mu$m.

8. The film according to claim 6, wherein the solvent is at least one solvent selected from the group consisting of water and hydrophilic organic solvents.

9. The film according to claim 6, wherein the solvent-soluble and non-hydrolyzable zirconium compound is at least one compound selected from the group consisting of zirconium oxychloride, zirconium hydroxychloride, zirconium nitrate and ammonium zirconium carbonate.

10. The film according to claim 6, wherein the amount of the zirconium compound is in the range of about 3 to about 200 parts by weight, as $ZrO_2$, per 100 parts by weight.

11. A composite of a film with a base material, which is made by coating the base material with a coating composition comprising titanium oxide particles having photo-catalytic activity, a solvent-soluble and non-hydrolyzable zirconium compound, and a solvent to form a film, and curing the film on the base material; said film having a thickness in the range of about 0.05 $\mu$m to about 2 $\mu$m.

12. The composition according to claim 11, wherein the metal oxide particles having photo-catalytic activity have an average particle diameter in the range of about 0.005 to 0.3 $\mu$m.

13. The composite according to claim 11, wherein the solvent-soluble and non-hydrolyzable zirconium compound is at least one compound selected from the group consisting of zirconium oxychloride, zirconium hydroxychloride, zirconium nitrate and ammonium zirconium carbonate.

14. The composite according to claim 11, wherein the amount of the zirconium compound is in the range of about 3 to about 200 parts by weight, as $ZrO_2$, per 100 parts by weight of the metal oxide particles having photo-catalytic activity.

15. The composite according to claim 11, wherein the base material is selected from ceramics, metals, glass, plastics, paper, wood, concrete, electric lamps and lighting fixtures.

* * * * *